United States Patent [19]

Aeschbach et al.

[11] Patent Number: 4,628,709

[45] Date of Patent: Dec. 16, 1986

[54] APPARATUS AND METHOD FOR PRODUCING KNITTED HOOK-TYPE FASTENER MATERIAL

[75] Inventors: Jurg Aeschbach, Manchester, N.H.; Edmund Rosa, Lowell, Mass.

[73] Assignee: Actief N.V., Curacao, Netherlands

[21] Appl. No.: 712,930

[22] Filed: Mar. 18, 1985

Related U.S. Application Data

[60] Continuation of Ser. No. 413,154, Aug. 30, 1982, abandoned, which is a division of Ser. No. 117,626, Feb. 1, 1980, abandoned, which is a continuation of Ser. No. 857,280, Dec. 5, 1977, abandoned.

[51] Int. Cl.[4] .......................... D04B 9/12; D04B 35/00
[52] U.S. Cl. .................................. 66/9 R; 28/161; 66/91; 66/147; 66/194
[58] Field of Search ................ 28/161; 66/9 R, 92, 66/93, 147, 151, 194, 91

[56] References Cited

U.S. PATENT DOCUMENTS

| | | | |
|---|---|---|---|
| 2,717,437 | 9/1955 | deMestral | 28/72 |
| 2,820,277 | 1/1958 | Förster | 24/204 X |
| 3,009,235 | 11/1961 | deMestral | 28/78 |
| 3,015,223 | 1/1962 | Moore | 66/147 |
| 3,083,737 | 4/1963 | De Mestral | 24/204 X |
| 3,138,841 | 6/1964 | Naimer | 24/204 |
| 3,191,255 | 6/1965 | Nealis | 28/161 X |
| 3,266,113 | 8/1966 | Flanagan, Jr. | 24/204 |
| 3,320,649 | 5/1967 | Naimer | 28/161 |
| 3,525,240 | 8/1970 | Piana et al. | 66/147 |
| 3,530,687 | 9/1970 | Hamano | 66/84 R |
| 3,539,436 | 11/1970 | Hamano | 24/204 X |
| 3,550,223 | 12/1970 | Erb | 24/204 |
| 3,607,995 | 9/1971 | Chiba | 24/204 X |
| 3,718,725 | 2/1973 | Hamano | 28/161 X |
| 3,727,433 | 4/1973 | Hamano | 66/84 R |
| 3,765,193 | 10/1973 | Conroux et al. | 66/9 R |
| 3,770,359 | 11/1973 | Hamano | 425/305 |
| 3,845,641 | 11/1974 | Waller | 66/192 |
| 3,853,680 | 12/1974 | Daniel | 66/9 B X |
| 3,967,470 | 7/1976 | Miura et al. | 66/147 |

FOREIGN PATENT DOCUMENTS

| | | | |
|---|---|---|---|
| 1289825 | 9/1972 | United Kingdom | 24/204 |
| 1350009 | 4/1974 | United Kingdom | 24/204 |

Primary Examiner—William C. Reynolds
Attorney, Agent, or Firm—Pennie & Edmonds

[57] ABSTRACT

A knitted material is disclosed having on one side a multiplicity of upstanding hook-like engaging elements suitable for repeated face-to-face engagement and disengagement with a material having a multiplicity of upstanding pile loop-like mating engagement elements. The material has a base knitted fabric and a plurality of upstanding monofilamentary members interknitted into the base fabric, with a hook-like engaging element positioned at the upper end of each upstanding member. The engaging element extends transversely of the upstanding member and is configured in cross section to have at least one end generally arcuate in shape and the opposite end tapered. The tapered end has greater flexibility than the arcuate end, and the fastener fabric is engageable in face-to-face relation with a mating loop-type fastener fabric and separated by forces normal to the interfacial plane of engagement.

18 Claims, 11 Drawing Figures

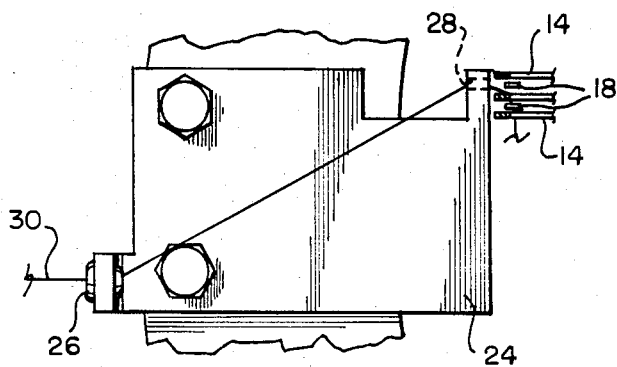
FIG. 4
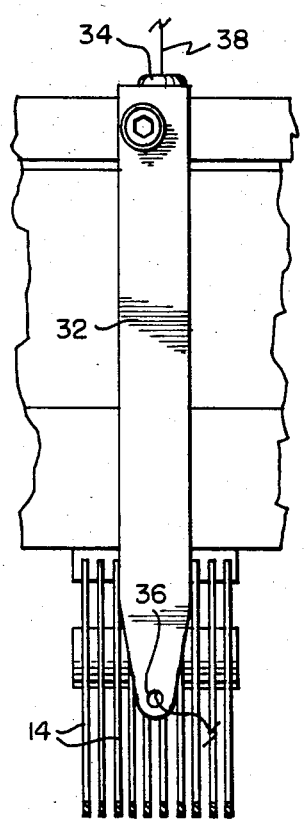
FIG. 5
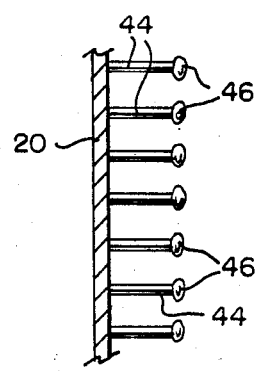
FIG. 9
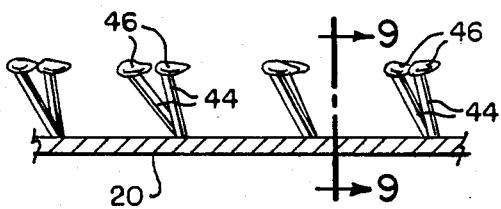
FIG. 8
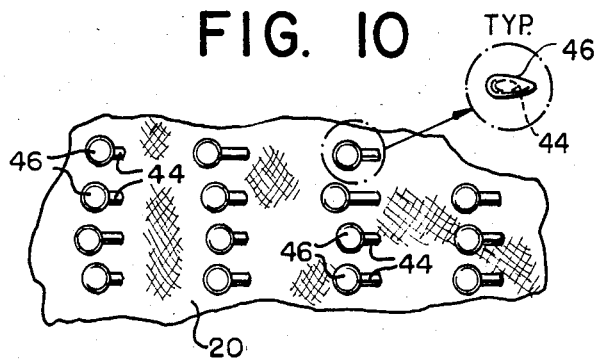
FIG. 10
FIG. 10A

APPARATUS AND METHOD FOR PRODUCING KNITTED HOOK-TYPE FASTENER MATERIAL

This is a continuation of application Ser. No. 413,154, filed Aug. 30, 1982, now abandoned, which is a division of application Ser. No. 117,626 filed on Feb. 1, 1980, now abandoned, which is a continuation of application Ser. No. 857,280 filed Dec. 5, 1977, now abandoned.

BACKGROUND OF THE INVENTION

1. Field of the Invention

This invention relates to a knitted fastener material and apparatus and method of producing the fastener material.

2. Description of the Prior Art

Separable fasteners such as those described in U.S. Pat. Nos. 2,717,437 and 3,009,235 which are marketed under the registered trademark VELCRO brand hook and loop fasteners by Velcro USA Inc., 681 Fifth Avenue, New York, N.Y. have gained wide acceptance because of the properties of the mating hooks and loops which permit their attachment by merely placing a surface defined by the hooks into face-to-face relationship with a surface defined by the loops so that a large number of hooks engage a large number of loops which resist separation parallel to the interfacial plane of engagement but are readily separable by peeling forces applied substantially normal to this interfacial plane. These fastening devices are generally formed of a sheet of woven or knitted fabric having raised threads of synthetic material, such as nylon, which are napped or unnapped, to provide a pile surface defined by a plurality of loops, and which may be thermally treated to become semi-rigid. Certain of the loops may then be cut along one side near their outer extremity to form hooks.

More recently, proposals have been advanced to produce hook and loop fasteners using techniques other than weaving. For example, hook-type fasteners have been molded of synthetic plastic materials and both hook and loop-type fasteners have been knitted of textile filamentary yarn materials.

Of the knitted fastener materials, attempts have been made to construct the fabric on raschel knitting machines as well as circular knitting machines. For the raschel knitting machines a serious problem was presented in properly guiding the yarn filamentary materials to the knitting zones in a manner to form pile-like members upstanding from the base knitted fabric so as to provide a suitable fabric material for ultimate use as part of a separable fastener material. For the circular knitting devices, it was found to be unusually difficult to utilize pile-forming lancets in connection with rotary sections of the machinery and to cause to be constructed the precise basic fabric having upstanding pile members which could be used as part of a separable fastener of the type contemplated herein. Additionally, difficulties were encountered in the production of hook-type elements from pile loop members wherein it was necessary to cut the loop members so as to form hooks which would be suitable for interengagement with a fastener fabric having a multiplicity of loop members upstanding from a basic fabric.

Aside from the above difficulties of developing a suitable apparatus from which could be constructed a base fabric having a multiplicity of hooking elements upstanding therefrom, as heretofore mentioned, the preciseness required to cut a multiplicity of monofilamentary loop members so as to form hook members has always been considered to be a relatively expensive technological development. In an effort to reduce the cost of producing such hooking elements, several developments have more recently concentrated upon the production of hook-type hooking elements having a well-known mushroom-like configuration, as opposed to the classical hook. However, such fastener materials have exhibited disadvantages peculiar to their production and configuration. As one example, it has been found that as compared to a material having hook-type hooking elements upstanding therefrom, the materials having mushroom hooking elements have been found to be capable of withstanding greater shear forces when engaged with a mating material having a plurality of loop members upstanding from one surface; however, the peel forces required to separate the mushroom fastener fabric from the loop member is also greater than the forces required to separate the classical hook fabric, while destruction of the loop members by the mushroom members is more rapid than that of the classical hook-type fabric. The end result of this phenomenon is that the cycle life of the mushroom/loop fastener device is significantly lower than that of the classical hook/loop cycle device.

While numerous reasons for this phenomenon have been advanced, a plausible theory concentrates on the constructional distinctions between the classical hook-type hooking element and the mushroom-type hooking element. These distinctions will lead a person ordinarily skilled in the art to conclude that the hook-type hooking element is more flexible by virtue of its reduced constructional mass as compared to the mushroom-type hooking element.

Raschel knit fastener fabrics and devices to produce these fabrics are disclosed in U.S. Pat. Nos. 3,539,436 and 3,530,687, both to Hamano. On the other hand, a method and apparatus for producing a circular knitted fastener fabric is disclosed in U.S. Pat. Nos. 3,765,193 to Conroux et al., 3,845,640 and 3,845,641, both to Waller, while a circular knit fastener fabric having projecting barbs is disclosed in U.S. Pat. No. 3,654,054 to Waller.

Examples of mushroom-type separable fastener fabrics may be found in U.S. Pat. Nos. 3,138,841 and 3,320,649, both to Naimer. U.S. Pat. Nos. 3,718,725 and 3,770,359, both to Hamano, disclose a method and apparatus for the manufacture of hook fabric material for fasteners wherein the hook elements have a general constructional configuration resembling the well-known mushroom. U.S. Pat. No. 3,266,113 to Flanagan, Jr., relates to a fastener having interacting unitary engageable articles disclosed for the engagement which complementary members are pressed together and disengagement upon separation.

While these developments have provided several generations of press and peel type fastener devices, the difficulties associated with their manufacture as well s those associated with their functioning abilities and fastening capabilities have provided some disadvantages in their regard, particularly when the cost of production is considered. We have invented a fastener of weft knitted material and an apparatus and method of producing the same, which combines the fastening capabilities of mushroom, with peel flexibility of hook, thereby resulting in an extremely effective fastening material. Moreover, our apparatus and method of producing this material provides a heretofore unknown inexpensive technique for constructing a superior weft knitted quasi-hook/quasi-mushroom fastener material in a single location from the yarn stage to the circular knit tube slitting stage, thus providing an alternative to the difficulties and disadvantages associated with the prior art devices.

SUMMARY OF THE INVENTION

In accordance with the present invention, a knitted material has on one side, a multiplicity of upstanding hook-like engaging elements suitable for repeated face-to-face engagement and disengagement with a material having a multiplicity of upstanding pile loop-like mating engaging elements. The material comprises a base knitted yarn fabric, a plurality of upstanding monofilamentary members interknitted into the base fabric, with a hook-like engaging element positioned at the free end portion of each upstanding member and extending generally transversely of the upstanding member. The hook-like transverse member is configured in cross section to have at least one end portion of a generally arcuate configuration, and an opposite tapered end portion which is of greater flexibility than the arcuate end portion, such that the inventive fastener fabric thus may be engaged in face-to-face relation with a mating loop-type fastener fabric and separated by forces substantially normal to the interfacial plane of engagement.

As will be seen in the description which follows, the preferred material is constructed of weft knitted heat stabilized nylon multifilamentary yarn and the arcuate end portion of the transverse hook-like member is somewhat similar to that of the well-known mushroom type hooking element, while the tapered section thereof is more flexible than the arcuate section. This unique combination of end configurations results in a hook-type fastener member which—in terms of performance characteristics—is somewhere between the performance characteristics of the well-known classical hook fastener tape and the well-known mushroom fastener type, thereby combining the fastening capability of mushroom with the peel flexibility of hook with a lesser destruction of loop material.

Moreover, the configuration of the present hook-type elements being more flexible in one direction than in the other could be expected to maximize their efficiency with a loop material if peeling of the fabric members is always conducted in a direction from the tapered portion toward the arcuate section. Since statistically in use the fastener materials could be expected to be separated approximately 25 to 50 percent of the time in each of, say, four different directions, the least which could be expected from the present configuration will still provide a significant increase in the cycle life of the fastener materials while maximizing their efficiencies.

The invention relates to a method of producing the inventive weft knitted material having on one side a multiplicity of upstanding engaging elements for repeated face-to-face engagement and disengagement with a member having a multiplicity of upstanding mating engaging elements, each engaging element having at least one filamentary member upstanding from one side of said fabric and having at the free end portion, an engaging portion, generally transverse to said upstanding member. The inventive method comprises knitting by circular knitting techniques, a base fabric layer of multifilamentary yarn material, and simultaneously knitting about lancets, a sequential series of monofilamentary pile loops upstanding from the base fabric layer, applying predetermined downward forces to the fabric during the formation thereof, and contacting the upper crest portions of the monofilamentary loop elements with a heated member by positioning the heated member in stationary relation adjacent the rotating monofilamentary loop elements after their formation, the heated member having a temperature sufficient to melt the crest portion of the loop elements and the relative rotary motion between the loop elements and the heated member resulting in the formation of generally transverse hook-like hooking elements positioned in the upper end portion of each upstanding filamentary leg member. The resultant configuration is that each transverse hooking element has a configuration in which at least one end portion is generally arcuate and the opposite end portion is generally tapered.

The invention also pertains to an apparatus for producing the inventive weft-knitted fastener material which comprises an upper cog wheel having a plurality of lancets secured thereto in a circular array and extending downwardly therefrom into a knitting zone, a lower cog wheel positioned immediately below said upper cog wheel and positioned for rotation with a plurality of latch-type knitting needles for weft knitting said fabric, means for rotating said upper and lower cog wheels at substantially the same rotational speeds, and means for reciprocating said latch needles upwardly and downwardly respectively, intermediate the lancets in an upward and downward weft knitting movement. The apparatus further comprises means for supplying multifilamentary yarn to the knitting zone for knitting the base fabric, means for supplying monofilamentary heat-deformable yarn to the knitting zone, means to guide the first-mentioned yarn to a position behind said lancets to form the base fabric, and means to guide the monofilamentary yarn to said knitting zone over said lancets to be interknitted with the base fabric simultaneously with its formation. The apparatus further comprises means for reciprocating the latch needles in an upward and downward and rotary motion intermediate said lancets to form in the knitting zone, a weft knit fabric having a plurality of monofilamentary loop-like elements upstanding from one surface and positioned about the lancets in generally parallel rows, heating means positioned below the knitting zone and adapted to selectively engage the upper end portions of the monofilamentary loop-like elements to separate the upstanding leg members of said loop-like elements to form engaging elements of the hook-type upstanding from said base fabric, and means positioned below said heating means for applying predetermined tension forces to the weft knitted material so as to stabilize the base fabric and upstanding loops during the application of heat and pressure to the loop members.

In the preferred embodiment, the base multifilamentary yarn is heat shrinkable and a series of electrical infrared heating devices are positioned within the circular array of knitting lancets spaced somewhat inwardly therefrom to heat shrink and stabilize the weft knitted fabric after its formation and as it rotates about the circular knitting zone. As will be readily observed, a significant constructional quasi-mushroom/quasi-hook feature of the hooking elements of the invention is directly related to the unique application of rotational circular knitting techniques, combined with a relatively stationary, selectively movable heated platen. When the platen is heated at least to the melt temperature of the preliminary monofilamentary loop elements, and is placed in contact with the elements as they rotate, the heat and drag on the elements result in the unique pancake configuration having physical characteristics of both mushroom and hook, while the loop destructional characteristics are far above those of mushroom. Since with the inventive apparatus the method may be practiced from the yarn stage to the cut tubular circular knit pancake fabric material, it is thus capable of producing the inventive fabric inexpensively as compared to the prior art. Further, since the production is by relatively rapid circular knitting techniques, coupled with rotary heating applications, the fabric may be produced at a significantly reduced cost and clearly greater volume. The weft knitted base fabric is preferably finish coated with an adhesive material to fix the base fabric so as to prevent deformation of the fabric due to stress and to render the fabric resistant to decomposition caused by washing and dry cleaning. The base fabric is preferably finish coated with a water based adhesive material, while maintained in a stretched condition on a tenter frame to thereby additionally secure and stabilize the monofilamentary engaging elements with respect to the base fabric.

BRIEF DESCRIPTION OF THE DRAWINGS

Preferred embodiments of the invention are described hereinbelow with reference to the drawings wherein:

FIG. 4 is a view of the knitting zone of the apparatus of FIG. 1;

FIG. 5 is a view of the knitting zone of the apparatus of the invention taken along lines 5—5 of FIG. 3;

FIG. 8 is a view partially in cross section, taken along lines 8—8 of FIG. 6, illustrating the hook-like pancake elements of the present invention;

FIG. 9 is a view of the hook-like elements of FIG. 8 taken along lines 9—9 thereof;

FIG. 10 is a plan view from above of the weft knitted fabric of FIG. 9 and

FIG. 10a is a perspective view of the weft knitted fabric of FIG. 10.

DETAILED DESCRIPTION OF THE PREFERRED EMBODIMENTS

Figure 1:
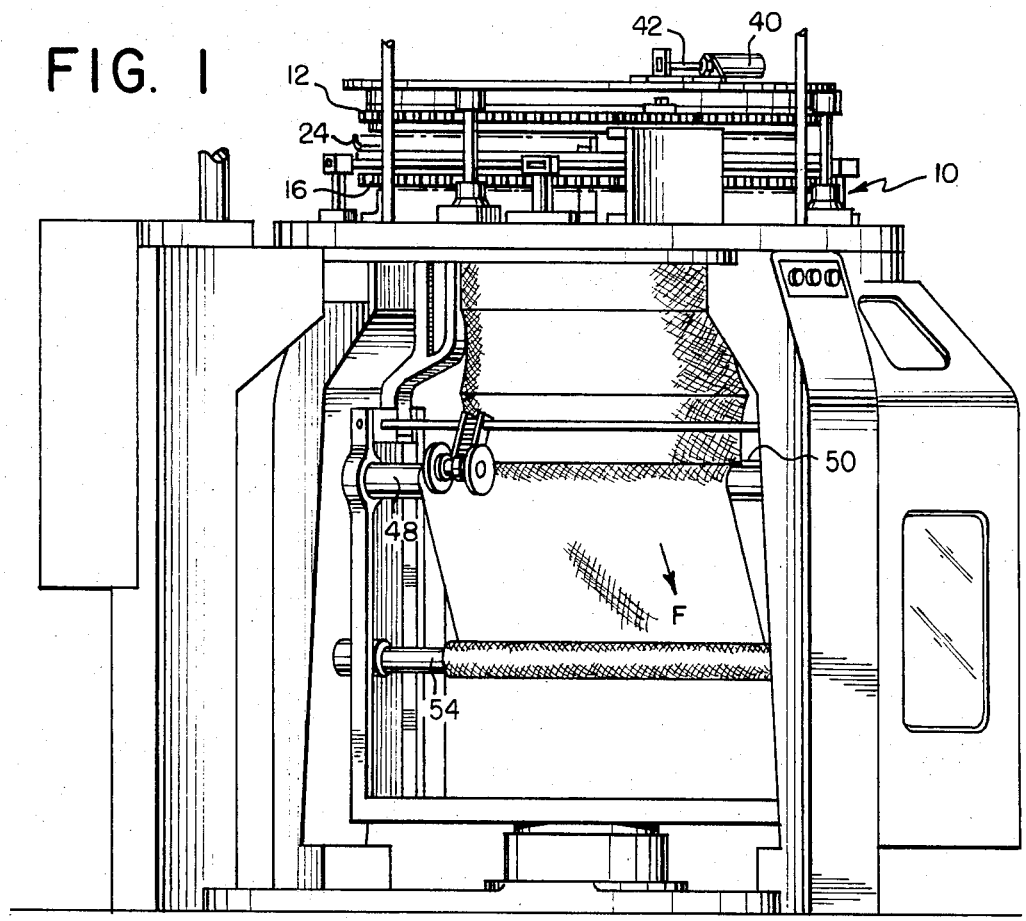
FIG. 1 is a diagrammatic view of the apparatus for producing weft knitted material according to the present invention.
Figure 2:
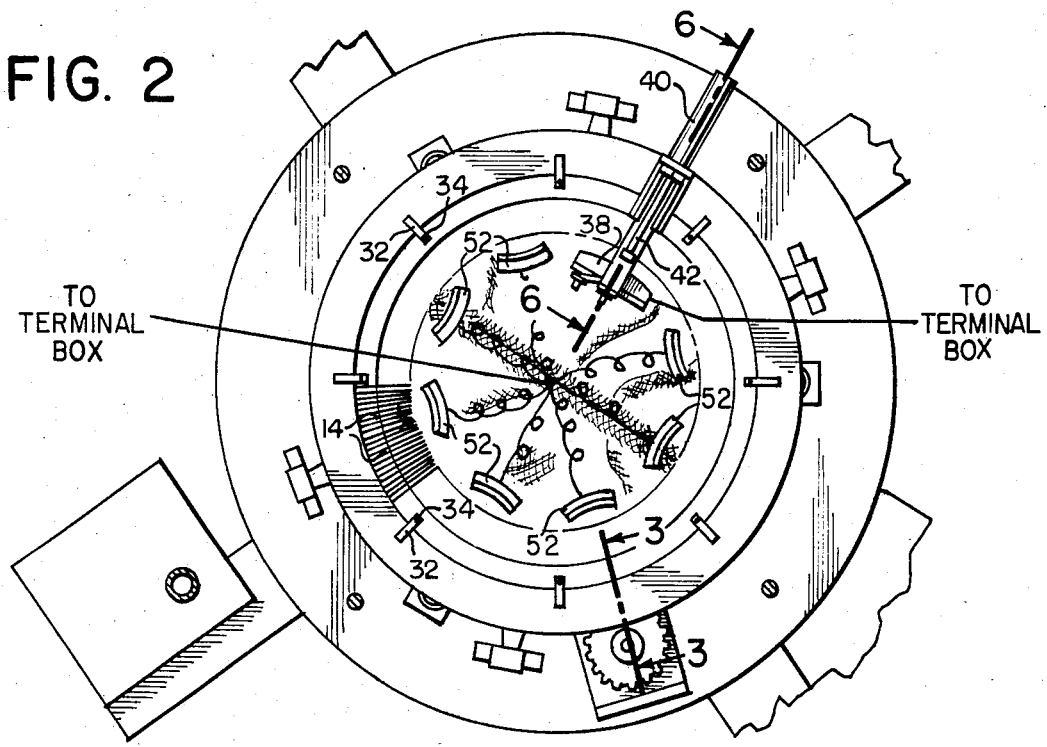
FIG. 2 is a plan view from above.
Figure 3:
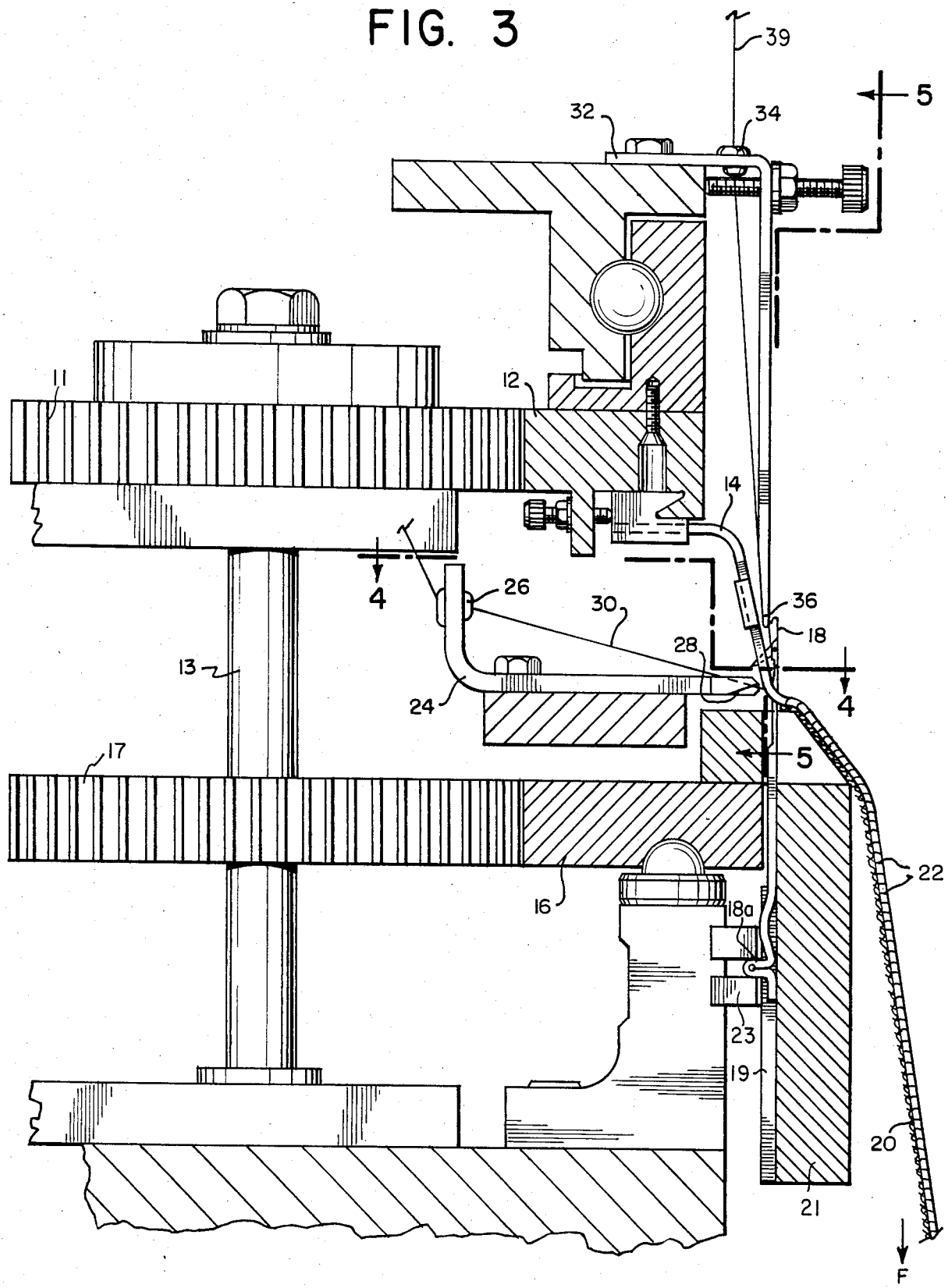
FIG. 3 is a cross-sectional view of the knitting and heating zones of the apparatus taken along lines 3—3 of FIG. 2 with certain components omitted for the purpose of clarity.

Referring to the drawings, FIG. 1 illustrates the weft knitting apparatus 10 constructed according to the invention. Referring to FIGS. 1, 2 and 3, an upper cog wheel 12, driven by gear 11 on geared shaft 13, has fixed thereto, a plurality of irregular shaped lancets 14 which extend from the upper wheel downwardly and inwardly through the knitting zone illustrated in FIGS. 3 and 4 and thereafter through heating and tensioning zones located immediately below the knitting zone as shown in FIG. 3.

A lower cog wheel 16 driven by gear 17 on shaft 13 is geared for rotation with upper cog wheel 12 and has a plurality of cam-operated latch needles 18 attached for upward and downward motion adapted to weft knit a base fabric 20 while simultaneously interknitting into the base fabric, a plurality of loop-like elements 22 about the lancets 14. The latch needles 18 are positioned within grooves 19 in needle bed 21 and are rotated withh the needle bed 21 to be actuated in upward and downward knitting motion by the engagement of butt portions 18a of latch needles 18 positioned within stationary cam system 23. As a given needle moves upwardly, the yarn in the needle causes the latch to pivot downwardly to the "open-needle" position. As the needle moves downwardly, the stitch currently around the stem of the needle causes the latch to pivot upwardly thereby closing the hook of the needle and causing the stitch to be cast off the needle. Lower cog wheel 16 is rotatably driven by gear 17 in time with needle bed 21. Upper cog wheel 12 is driven by gear 11 also in time with lower cog wheel 16 and the needle bed 21. Thus lancets 14 rotate at the same speed as latch needles 18.

A plurality of angle brackets 24, yarn guides 26 and 28 are positioned in a circular array to guide multifilamentary heat-deformable yarn 30 to the knitting zone from behind each lancet 14 for use in weft knitting the base fabric 20. A plurality of right angle brackets 32 support yarn guides 34 and 36 in a circular array to direct heat-deformable monofilamentary yarn 39 from a suitable bobbin (not shown) to the knitting zone forward of the upper end portion of the lancet 14.

Latch needles 18 are positioned for rotation with wheel 16 and are cam-operated for upward and downward weft knitting motion as the upper and lower cog wheels are rotated. Further, as the lancets are rotated with the upper cog wheel, each latch needle enters into the space between adjacent lancets, while lifting the base fabric-forming multifilament and loop-forming monofilament yarns through a weft knitting cycle to form a multifilamentary base fabric 20 having monofilamentary loops 22 extending over the lancet while maintaining the loop-forming yarn in the same course as it extends from wale to wale.

In operation, nylon, polyolefin or polyester multifilamentary yarn material 30 is directed through yarn guides 26 and 28 to the latch needle knitting zone to form the basic knitted fabric. Polypropylene or any polyolefin, or polyester monofilamentary yarn material is directed through yarn guides 34 and 36 to latch needle knitting zone to be interknitted simultaneously with the formation of the basic knitting fabric while being positioned about the lancets 14. Although the materials noted are used in the preferred form, other suitable knitted yarn materials may be used, provided such yarns are heat deformable or heat shrinkable.

The upper and lower cog wheels are rotated and latch needles 18 traverse an upward and downward pivotal terry-motion which simultaneously forms weft knitting base fabric 20 and parallel rows of upstanding monofilamentary loop elements 22 positioned about the lancets from wale to wale in the same course. Latch needles 18 proceed upwardly and downwardly in a conventional weft knitting cycle and lift the yarns looped thereabout in a conventional manner as the base fabric 20 is formed. In the present invention, uniquely configured lancets 14 are utilized to prevent excessive lifting of the fabric 20 by needles 18 as they move upwardly. Thus, it will be appreciated that the inventive lancets 14 prevent excessive upward movement of the fabric which would otherwise be accomplished by sinkers of a known type. In the present arrangement, the need for such sinkers is obviated. The fabric thus constructed has a tubular configuration and the loop elements face the inner portion of the tube as shown in FIG. 3.

Figure 6:
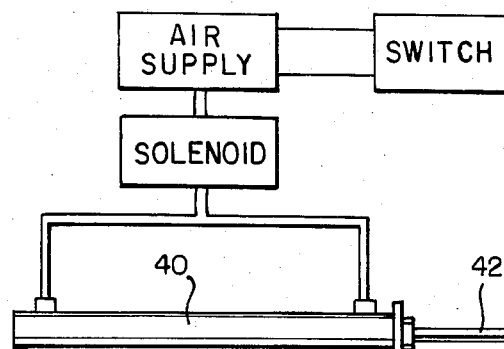
FIG. 6 is a view partially in cross section of the knitting, heating and tensioning zones of the apparatus of FIG. 2 taken along lines 6—6 of FIG. 2.
Figure 6:
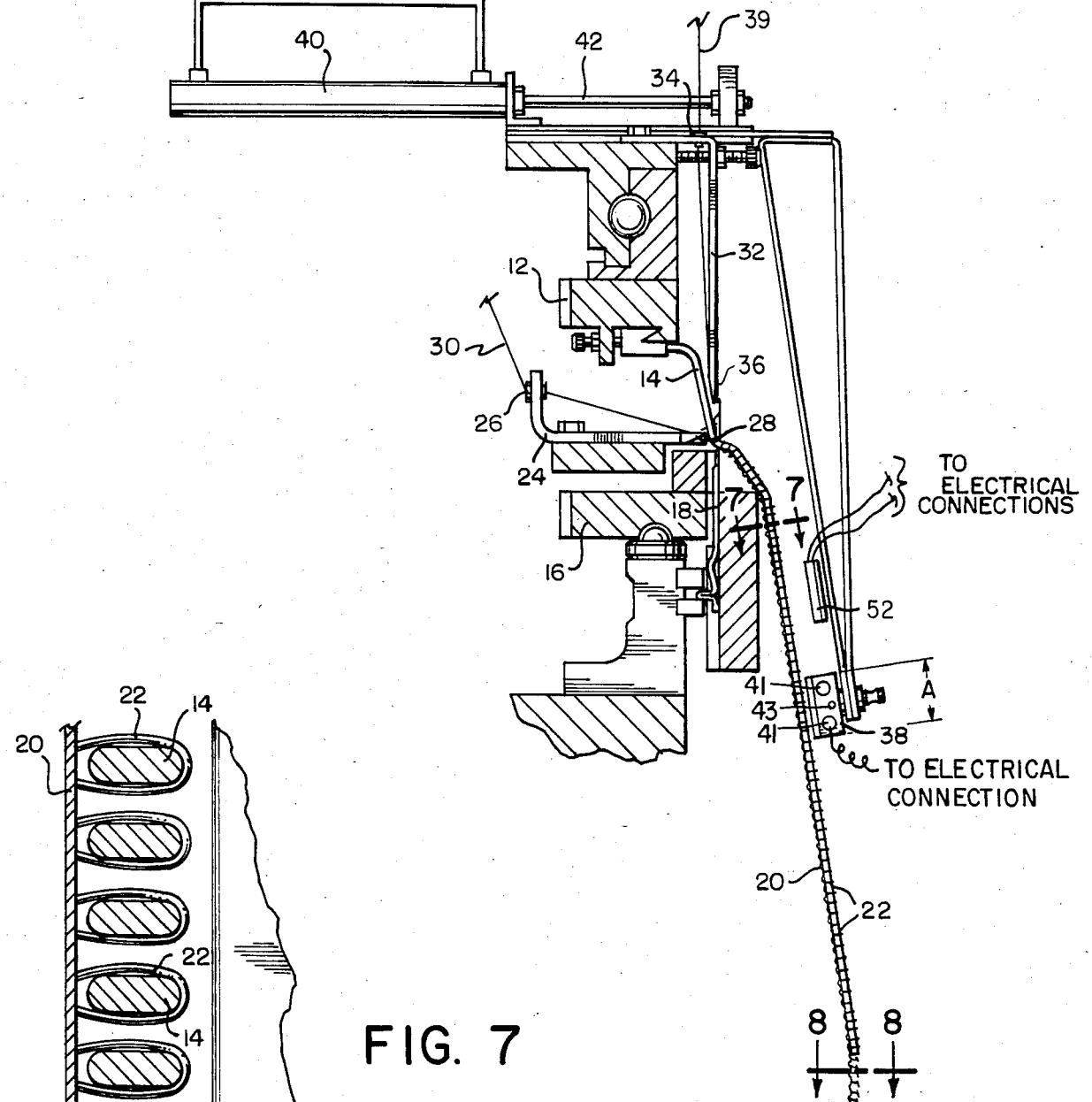
Figure 7:
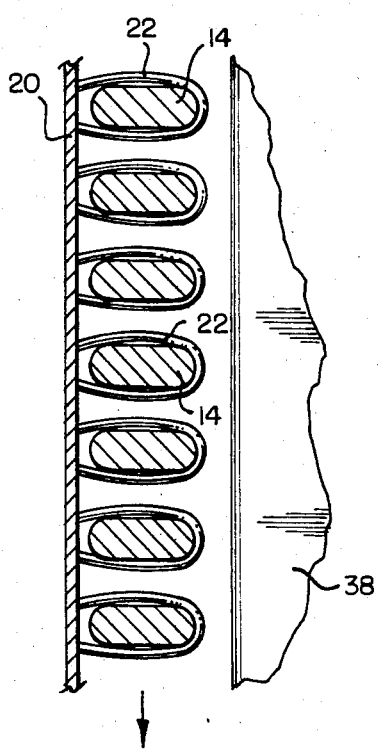
FIG. 7 is a view partially in cross section, illustrating the formation of loop-like elements over lancets as taken along lines 7—7 of FIG. 6.

Referring to FIG. 6, an electrically heated platen 38 is constructed of heat conductive material such as copper, aluminium etc. and is movable toward and away from the rotating fabric thus formed by hydraulic cylinder 40 and piston connector rod 42. The platen 38 is heated by electrical probes 41 positioned within openings in the platen and controlled by thermocouple 43. The platen has an arcuate configuration on the portion facing outwardly toward the rotating fabric thus formed so as to be simply movable into and out of engagement with the crests of the loop elements 22, as they are rotated simply by actuation of the actuator 40 and connector rod 42. The actuator 40 may be manually operated, but is preferably selectively automatically actuated in timed sequence with the beginning and ending of the knitting operation. For example, actuator 40 shifts connector rod 42 and platen 38 inwardly to contact the monofilamentary loops a predetermined time after starting the knitting operation to make certain that the fabric 20 is rotating when contact is made, and that the application of heat is uniform throughout the knitting process. Such uniformity is necessary to make certain that the hooking elements are formed according to the the preferred configuration described herein. With the arcuately configured surface of the heated platen 38 facing outwardly and conforming substantially to the arcuate arrangement of the lancets and loop elements, the heated platen 38 will selectively engage the crests of the monofilament loop elements 22, as take up roll 54 applies a downward force "F" in FIGS. 1 and 3. Because of the rotary motion of the monofilament loops, the end portions of the loop members thus become separated leaving two upstanding leg members 44 as shown in FIGS. 8 and 9. The number of loop yarns fed to the machine will determine the actual amount of material produced in one revolution of the machine. Accordingly, dimension "A" of heated platen 38 as shown in FIG. 6 may be predetermined for a given number of loop feeds to make certain that each loop is actually contacted by the platen 38 at least one time during a single revolution of the material 20.

Simultaneously with this leg formation, the upper end portion of each leg is melted and the relative rotary motion between the heat platen and the monofilamentary loop elements thereby formed results in the formation of uniquely shaped hooking melt formed engaging members 46, as shown in FIG. 9, having a pancake configuration as shown in FIG. 8. This configuration is due particularly to the relative rotary motion between the rotating loop members 22 and the arcuate heated platen 38, resulting in transverse hooking members 46 which have in one plane, as viewed in FIG. 8, i.e., in a plane extending downwardly through the hook-like engaging element, a somewhat arcuate cross-sectional forward end portion and a generally tapered rear end portion. The tapered end portion of the hook-like engaging elements is of lesser average thickness than the arcuate end portion. As viewed from the front, the hooking elements have the relatively circular appearance and general cross sectional configuration as shown in FIG. 9, with the top view of the hooking elements being as shown in FIG. 10.

Referring further to FIGS. 1 and 3, after fabric 20 is formed, it is looped under and over a pair of rollers. Of these, roller 48 is a front roller and 50 is a rear roller. The fabric assumes the form of an "S" and thereafter the fabric is rolled onto lower take-up roll 54, the rotational speed of which is controlled to apply a predetermined downward tension to the material thus formed. As the basic knitted fabric 20 moves downwardly away from the knitting zone, monofilamentary loops 22 slide downwardly along lancets 14. The tension thus applied is in a downward direction generally centrally located with respect to the apparatus. The central downward forces on the fabric cause the monofilament loop elements to be tensioned about the lancets 14 such that upon the application of heat by platen 38, the crests of the loops melt causing the leg members to separate readily, while the relative motion between the leg members and the heated platen produces a pancake-type hooking element having a generally airfoil configuration shown in FIGS. 8 and 9. The particular shape of the hooking element will depend upon the actual knitting speed selected, the actual temperature of the heated platen 38 selected, and the physical properties and dimensions of the monofilamentary yarn selected.

The apparatus as viewed in FIGS. 2 and 6 illustrates optional infrared (or other suitable type) heating elements 52 for heat stabilizing the base fabric 20 thus formed and the loop elements 22 positioned about lancets 14. These heating elements are maintained at temperatures sufficient to heat the base fabric 20 and monofilamentary loop elements 22 to cause shrinkage thereof, with resultant stability of the fabric. To further stabilize the fabric after production, it is preferably stretched on a tenter frame (not shown) and coated with a water-based or other suitable adhesive material, i.e. solvent based adhesives such as polyesters, polyurethanes, or hot melt type adhesives such as polyesters or polyethylenes, etc. to further stabilize the base fabric and interknitted hooking elements.

Referring now to the Figs. each hooking element formed has an upstanding leg member 44 and at the upper end portion, a transverse member which as a cross-sectional configuration or a configuration as viewed from one side, as shown in FIGS. 8 and 9. In particular, one end portion of the transverse member is arcuately configured and the other end portion is tapered. Because of this unique configuration, pressing the hook-like fabric in face-to-face relation with a loop-type fabric will result in ready engagement of the hook-like elements with the loop-like elements, while peeling the fabrics apart will result in separation of the fabrics. Since the loop-type fabrics contemplated included pile loop materials, it will be appreciated that destruction of the loops or loop-like members will reduce the holding power of the separable fastener. Because of the movement and the heated surface configuration of platen 38, the upper surface of each hooking member 46 is substantially flat and the entire hooking member as viewed from the top and side has the general appearance of a pancake configuration.

The unique configuration of the hooking members has proven greater peel flexibility in the direction from the tapered end portion toward the arcuate end portion than in the opposite peel direction, particularly because of the greater flexibility of the tapered end portion when it flexes relative to the leg member 44, as compared to the flexibility of the arcuate end portion. The asymmetric configurations of the hook-like engaging elements is such that the forces required to separate the hook-like elements from engaged loop-like elements in a direction from the arcuate end portions toward the generally tapered end portions are greater than the forces required to separate the hook-like elements in the opposite direction. Thus, it will be appreciated that the arcuate end portion is somewhat similar to the well-known "mushroom" type hooking elements, while the tapered end portion is of greater flexibility than the arcuate end portion. Since probability theory dictates that peeling of the hook-type fabric from a loop-type fabric will occur in a direction from the tapered end portion toward the arcuate end portion in at least 25 to 50 percent of the fabric separations, and since loop destruction is inversely proportional to hook flexibility, the corresponding destruction of the loop members of the loop-type fabric will thus be correspondingly reduced as compared to the destruction which took place between the well-known mushroom fabrics and the loop-type fabrics. The present invention thus provides several significant features, particularly in that the peel strength is greater than the classical hook fabrics, while less than the well-known mushroom fabrics, with loop-type fabric cycle life being approximately equivalent to that occurring with the classical hook fabric—which is substantial.

Further, it has been found that the pancake fastener material constructed according to the invention—when combined with a known loop material—provides a closure having shear strength greater than the classical hook fastener fabrics of the prior art. However, when compared to mushroom fastener fabrics, shear strength of the instant fabric is substantially lower, while cycle life is also substantially lower. To the extent that peelability and loop fabric cycle life are significant, these test results substantiate the advantages of the present pancake fastener fabric, particularly because it is relatively inexpensive to construct as compared to the classical hook fabric while, in comparison to mushroom fabric, the cost is either comparable or less.

In a typical comparison test between hooking elements of the classical hook-type, mushroom elements, and the present inventive pancake elements, all being of comparable size, the following normalized results were obtained.

|  | Hook 80/Lp | Pancake/Lp | Mushroom/Lp |
|---|---|---|---|
| Peel (PIW) | 1.05 | 1.23 | 5.60 |
|  | 0.95 | 1.26 | 2.40 |
| Shear (PSI) | 11.5 | 17.0 | 88.8 |
|  | 9.0 | 14.2 | 78.7 |
| Cycle Life | 10,000 | 10,000 | 100.0 |

It can therefore be readily understood that the unique configuration of the hooking elements allows them to release the loop elements of the mating member without destruction of the loops as in the case of the mushroom-shaped elements. In particular, it can be seen that the pancake-arcuate/tapered configuration of the hooking elements provides such flexibility to the hooking members of the hooking elements without compromising engaging strength, and this flexibility permits the flexible release of the hook and loop-type elements by the application of peel forces to the mating members. As previously mentioned, the probability of peeling the fastener members apart in the direction extending from the tapered to the arcuate end portion of the hooking member is also sufficiently significant that loop-cycle life may be preserved.

We claim:

1. A method of producing a weft knitted material having on one side a multiplicity of hook-like engaging elements suitable for repeated face-to-face engagement and disengagement with a material having a multiplicity of upstanding pile loop-like engaging elements, which includes a base knitted fabric, a plurality of upstanding hook-like engaging elements having substantially the same height, comprising:
  (a) knitting by circular knitting techniques a base fabric layer of multifilamentary yarn material and simultaneously knitting about lancets, a sequential series of monofilamentary pile loop elements upstanding from said base fabric, said circular knitting causing said monofilamentary loop elements to move rotationally;
  (b) applying predetermined downward forces to said fabric during the formation thereof;
  (c) contacting the upper crest portions of said monofilamentary pile loop elements with a heated member by positioning the heated member in stationary relation adjacent the rotating monofilamentary loop elements after their formation, said heating member having a temperature sufficient to melt the crest portions of the loop elements such that substantially all said hook-like engaging elements are formed of a first monofilamentary member interknitted into and upstanding from said base fabric, and the relative rotary motion between the loop elements and the heated member resulting in the formation of a second melt formed engaging member positioned at the free end portion of said first upstanding monofilamentary member and extending generally transversely thereof, said second melt formed transverse members each being generally asymmetrically configured to have at least one end portion having a generally arcuate cross sectional configuration in a plane extending downwardly through said hook-like engaging element and an opposite tapered end portion of lesser average thickness than said arcuate end portion and being of greater flexibility than said arcuate end portion, such that the fabric may be placed in face-to-face relation with such mating loop-type material with the result that numerous engagements take place between the hook-like and loop-like elements, and separated by forces substantially normal to the interfacial plane of engagement, the asymmetric configurations of said hook-like engaging elements being such that the forces required to separate the hook-like elements from engaged loop-like elements in a direction from the arcuate end portions toward the generally tapered end portions are greater than the forces required to separate the hook-like elements in the opposite direction.

2. The method of producing the weft knitted fabric according to claim 1 wherein said multifilamentary yarn material is nylon and said plurality of monfilamentary pile loop elements are is either polyolein or polyester.

3. The method according to claim 1, comprising knitting by circular knitting techniques said base fabric of at least one of polyolefin and polyester monofilamentary yarn material.

4. The method of producing weft knitted material according to claim 2, further comprising subjecting said base fabric and interknitted monofilamentary loop elements to heat to stabilize said knitted base fabric and said loop elements while said loop elements are positioned about said lancets prior to contacting said loop elements with said heated member.

5. The method of producing weft knitted material according to claim 3, further compromising knitting said base fabric in a tubular configuration.

6. A method of producing a weft knitted material having on one side a multiplicity of hook-like engaging elements suitable for repeated face-to-face engagement and disengagement with a material having a multiplicity of upstanding pile loop-like engaging elements, which includes a base knitted fabric, a plurality of upstanding hook-like engaging elements having substantially the same height, comprising:
(a) knitting by circular knitting techniques a base fabric layer of multifilament yarn material and simultaneously knitting about lancets, a sequential series of monofilamentary pile loop elements upstanding from said base fabric layer, said circular knitting causing said monofilamentary loop elements to move rotationally;
(b) applying predetermined downward forces to said fabric during the formation thereof;
(c) maintaining said predetermined downward forces during the fabric formation to cause said monofilamentary loop elements to move downwardly along said lancets in a generally equally spaced parallel relation and to maintain substantially equal heights of said loop elements thus formed;
(d) heating the fabric thus formed at a temperature sufficient to shrink the base fabric and loop elements to thereby provide stability to said fabric and interknitted loop elements;
(e) selectively contacting the upper crest portions of said rotating monofilamentary loop elements with a stationary heated platen having an outwardly facing generally convex arcuate heated surface corresponding generally to the curvature of the fabric thus formed, said heated platen having a temperature sufficient to melt the crest portions of the loop elements such that substantially each of all said hook-like engaging elements are formed of a first monofilamentary member interknitted into and upstanding from said base fabric, and the relative rotary motion between said loop elements and said heated platen resulting in the formation of a second melt formed engaging member positioned at the free end portion of said first upstanding monofilamentary member interknitted into said base fabric and extending generally transversely thereof, said second melt formed transverse members each being generally asymetrically configured to have at least one end portion having a generally arcuate cross sectional configuration in a plane extending downwardly through said hook-like engaging element and an opposite tapered end portion of lesser average thickness than said arcuate end portion and being of greater flexibility than said arcuate end portion, such that the fabric may be placed in face-to-face relation with such mating loop-type material with the result that numerous engagements take place between the hook-like and loop-like elements, and separated by forces substantially normal to the interfacial plane of engagement, the asymmetric configurations of said hook-like engaging elements being such that the forces required to separate the hook-like elements from engaged loop-like elements in a direction from the arcuate end portions toward the generally tapered end portions are greater than the forces required to separate the hook-like elements in the opposite direction.

7. The method according to claim 6 further comprising stretching said fabric and applying an adhesive material to stabilize further the base fabric and the interknitted upstanding elements.

8. An apparatus for producing a weft knitted material having on one side a multiplicity of hook-like engaging elements suitable for repeated face-to-face engagement and disengagement with a material having a multiplicity of upstanding pile loop-like engaging elements, which includes a base knitted fabric, a plurality of upstanding hook-like engaging elements having substantially the same height, which comprises:
(a) an upper cog wheel having a plurality of lancets secured thereto in a circular array and extending downwardly therefrom into a knitting zone;
(b) a lower cog wheel positioned immediately below said upper cog wheel and a plurality of latch-type knitting needles positioned for rotation with said lower cog wheel for weft knitting said fabric;
(c) means for rotating said upper and lower cog wheels at substantially the same rotational speeds;
(d) means for reciprocating said latch needles upwardly and downwardly respectively, intermediate said lancets in an upward and downward weft knitting movement;
(e) means for supplying multifilamentary yarn to said knitting zone for knitting the base fabric;
(f) means for supplying monofilamentary heat-deformable yarn to said knitting zone;
(g) means to guide said first-mentioned yarn to a position behind said lancets to form said base fabric;
(h) means to guide said monofilamentary heat-deformable yarn to said knitting zone over said lancets to be interknitted with said base fabric simultaneously with its formation;
(i) means for reciprocating said latch needles in an upward and downward motion and rotating said needles in a rotary motion to form in said knitting zone, a weft knit fabric having a plurality of monofilamentary loop-like elements upstanding from one surface and positioned about said lancets in generally parallel rows;
(j) heating means positioned below said knitting zone and adapted to selectively engage the upper end portions of said rotating monofilamentary loop-like elements, said heating means having a temperature sufficient to melt the crest portions of the loop elements such that substantially all said hook-like engaging elements are formed of a first monofilamentary member interknitted into and upstanding from said base fabric, and the relative rotary motion between said loop elements and said heating means resulting in the formation of a second melt formed engaging member positioned at the free end portion of said first upstanding monofilamentary member interknitted into said base fabric and extending generally transversely thereof, said second melt formed transverse members each being generally asymetrically configured to have at least one end portion having a generally arcuate cross sectional configuration in a plane extending downwardly through said hook-like engaging elements and an opposite tapered end portion of lesser average thickness than said arcuate end portion and being of greater flexibility than said arcuate end portion, such that the fabric may be placed in face-to-face relation with such mating loop-type material with the result that numerous engagements take place between the hook-like and loop-like elements, and separated by forced substantially normal to the interfacial plane of engagement, the asymmetric configurations of said hook-like engaging elements being such that the forces required to separate the hook-like elements from engaged loop-like elements in a direction from the arcuate end portions toward the generally tapered end portions are greater than the forces required to separate the hook-like elements in the opposite direction; and (k) means positioned below said heating means for applying predetermined tension forces to said weft knitted material so as to stabilize said base fabric and upstanding loops during the application of heat and pressure to said loop members.

9. The apparatus for producing a weft knitted material according to claim 8, wherein said means to guide heat deformable yarn to said knitting zone for knitting the base fabric comprises a plurality of yarn guides positioned in a circular array adajcent the knitting zone and said lancets.

10. The apparatus for producing a weft knitted material according to claim 9, wherein said upper cog wheel has a generally circular configuration and a plurality of lancets are positioned in a circular arrangement about said cog wheel to define said circular knitting zone.

11. The apparatus for producing a weft knitted material according to claim 10, wherein said heating means adapted to engage the upper end portions of said monofilamentary loop elements comprises a heated platen having an outwardly facing arcuate configuration and electrical means to maintain the temperature of said platen at least at the melt temperature of said monofilamentary loop elements.

12. The apparatus for producing a weft knitted material according to claim 11, wherein said heated platen is movable from a position in engagement with said loop elements below the knitting zone to a position radially away from said loop elements.

13. The apparatus for producing a weft knitted material according to claim 12, further comprising hydraulic means connected to said electrically heated platen to shift said platen from positions into and out of contact with said monofilamentary loop elements to positions radially away from said loop elements.

14. The apparatus for producing a weft knitted material according to claim 13, comprising first means for heating said fabric while said loop elements are positioned about said lancets, said first heating means being positioned below the knitting zone and above the point of contact with said electrically heated platen and providing radiation heat to stabilize the base fabric and the loop elements after formation thereof, but prior to thermally forming said hook-like engaging elements with said heated platen.

15. The apparatus for producing a weft knitted material according to claim 14, further comprising means to apply an adhesive material to said base fabric so as to stabilize said base fabric and secure said monofilamentary elements thereto.

16. An apparatus for producing a weft knitted material having on one side a multiplicity of hook-like engaging elements suitable for repeated face-to-face engagement and disengagement with a material having a multiplicity of upstanding pile loop-like engaging elements, which includes a base knitted fabric, a plurality of upstanding hook-like engaging elements having substantially the said height, which comprises:

(a) an upper cog wheel having a plurality of lancets secured thereto in a circular array and extending downwardly therefrom into a knitting zone;

(b) a lower cog wheel positioned immediately below said upper cog wheel and a plurality of latch-type knitting needles positioned for rotation with said lower cog wheel for weft knitting said fabric;

(c) means for rotating said upper and lower cog wheels at substantially the same rotational speeds;

(d) means for reciprocating said latch needles upwardly and downwardly respectively, intermediate said lancets in an upward and downward weft knitting movement;

(e) means for supplying heat-deformable yarn to said knitting zone for knitting the base fabric;

(f) means for supplying monofilamentary heat-deformable yarn to said knitting zone;

(g) means to guide said first-mentioned yarn to a position behind said lancets to form said base fabric;

(h) means to guide said monofilamentary yarn to said knitting zone over said lancets to be interknitted with said base fabric simultaneously with its formation;

(i) means for reciprocating said latch needles in an upward and downward and rotary motion intermediate said lancets to form in said knitting zone, a weft knit fabric having a plurality of monofilamentary loop-like elements upstanding from one surface and positioned about said lancets in generally parallel rows;

(j) first heating means positioned below said knitting zone and adapted to heat said material to stabilize said base fabric and loops after formation;

(k) heating means positioned below said first heating means and adapted to selectively engage the upper end portions of said rotating monofilamentary loop-like elements, said heating means having a temperature sufficient so as to apply heat to melt the crest postions of the loop elements such that substantially all said hook-like engaging elements are formed of a first monofilamentary member interknitted into and upstanding from aid base fabric, and the relative rotary motion between said loop members and said heating means resulting in the formation of a second melt formed engaging member positioned at the free end portion of said first upstanding monofilamentary member interknitted into said base fabric and extending generally transversely thereof, said second melt formed transverse members each being generally asymetrically configured to have at least one end portion having a generally arcuate cross sectional configuration in a plane extending downwardly through said hook-like engaging element and an opposite tapered end portion of lesser average thickness than said arcuate end portion and being of greater flexibility than said arcuate end portion, such that the fabric may be placed in face-to-face relation with such mating loop-type material with the result that numerous engagements take place between the hook-like and loop-like elements, and separated by forces substantially normal to the interfacial plane of engagement, the asymmetric configurations of said hook-like engaging elements being such that the forces required to separate the hook-like elements from engaged loop-like elements in a direction from the arcuate end portions toward the generally tapered end portions are greater than the forces required to separate the hook-like elements in the opposite direction;

(l) means positioned below said heating means for applying predetermined tension forces to said weft knitted material so as to stabilize said base fabric and upstanding loops during the application of heat and pressure to said loop members.

17. The apparatus according to claim 16 wherein said heating means adapted to selectively engage the upper end portions of said monofilamentary loop-like elements comprises a heated platen having at least one arcuately configured side portion.

18. The apparatus according to claim 17 wherein said heated platen is fabricated of copper material and is heated by electrical heating means.

* * * * *